(No Model.)

M. L. WILCOX.
BICYCLE BALL BEARING.

No. 570,860. Patented Nov. 3, 1896.

Melvin L. Wilcox,
Inventor.

Witnesses:
Ada Gregg
John A. Gregg

UNITED STATES PATENT OFFICE.

MELVIN L. WILCOX, OF BAY CITY, MICHIGAN.

BICYCLE BALL-BEARING.

SPECIFICATION forming part of Letters Patent No. 570,860, dated November 3, 1896.

Application filed October 12, 1895. Serial No. 565,508. (No model.)

*To all whom it may concern:*

Be it known that I, MELVIN L. WILCOX, a citizen of the United States, residing at Bay City, in the county of Bay and State of Michigan, have invented certain new and useful Improvements in Bicycle Ball-Bearings; and I do hereby declare the following to be a full, clear, and exact description of the invention, such as will enable others skilled in the art to which it appertains to make and use the same.

My invention relates to improvements in bicycle ball-bearings; and it consists in the combination, arrangement, and construction of the parts with the object of producing a seat, and means for adjusting the balls to the seat, and at the same time produce means for evenly distributing the pressure upon the balls when new adjustments are made.

My improved ball-bearing seat and the adjustments are illustrated in the accompanying drawings, forming a part of this specification, in which similar letters of reference indicate corresponding parts in both of the illustrations.

Figure 2:
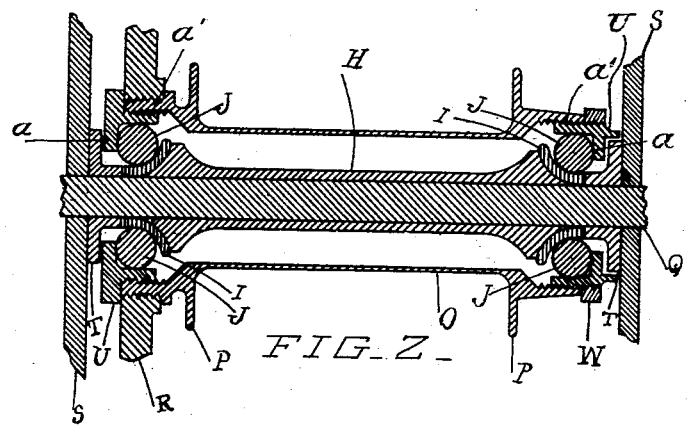
Figure 1:
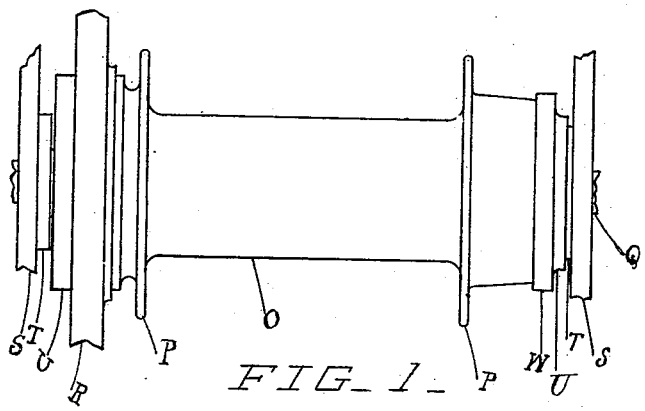

In the drawings, Figure 1 is a side elevation of a bearing which embodies my invention. Fig. 2 is a vertical longitudinal section of the same.

Referring to the hub, (shown in section,) O represents the wheel-hub, provided with flanges P P for the purpose of sustaining the spokes that support the rim of the wheel, which is not shown in the illustrations.

Q represents the hub-shaft, with its ends broken off.

R is the driven sprocket-wheel, which has also its rim broken away, and S S represents a broken-off portion of the fork end of the frame that supports the hub O by means of the shaft Q.

T represents two flanged sleeves, which are adapted to fit on the ends of the shaft Q by means of the openings provided therein, with the inner end of the said sleeves T T resting against the outer ends of the cone-shaped concavo-convex ball-races I I and the flanged ends resting against the inner walls of the forked end frame portions S S, whereby efficient supporting-shoulders are provided for the outer end of the cone-shaped concavo-convex ball-races I I.

U represents the adjusting-caps, which are provided with inwardly-projecting flanges $a'$ and downwardly-projecting flanges $a$, each upwardly-projecting flange being provided with threads upon its outer walls and screwed on the end of the hub O by means of threads provided therein, whereby the inner walls of the adjusting-caps U serve for the outer bearings and the downwardly-projecting flanges serve for the thrust bearings for the balls J J, and the outwardly-projecting flange of the adjusting-cap U has its outer wall made circular in form, thereby applying a spanner to the outwardly-extending flange, and by turning it in the desired direction any desired adjustment may be obtained.

The end of the hub O annexed to the adjusting caps U has threads provided on its outer walls for the purpose of securing the sprocket-wheel R thereto by means of threads provided on its inner walls and screwed thereon. The opposite end of the cap U is provided with an inwardly-projecting flange on its outer end, and its inner end is provided with threads on its outer walls, which are screwed into the said opposite end of the hub O by means of threads provided therein and secured by means of a jam-collar W. The inner walls of the said cap U provide the outer bearings and the inwardly-projecting flange provides the thrust-bearings for the balls J J.

In removing and replacing the bearings in the hub O it is only necessary to remove the hub-shaft Q and release the hub O from the frames S S. Then by removing the cap U the parts may be easily removed and replaced in the same manner.

Having thus described my invention, what I claim is—

The hub O provided with flanges P, and the shaft Q, combined with the sleeve H applied to the shaft and provided with enlarged ends, the balls J, the flanged sleeves T placed upon the shaft and having their inner ends to bear against the outer ends of the races; the races I, and the adjusting-caps U, secured into the ends of the hub and provided with flanges upon their outer end, substantially as shown.

In testimony whereof I affix my signature in presence of two witnesses.

MELVIN L. WILCOX.

Witnesses:
 ADA GREGG,
 JOHN A. GREGG.